US007299364B2

(12) United States Patent
Noble et al.

(10) Patent No.: US 7,299,364 B2
(45) Date of Patent: *Nov. 20, 2007

(54) METHOD AND SYSTEM TO MAINTAIN APPLICATION DATA SECURE AND AUTHENTICATION TOKEN FOR USE THEREIN

(75) Inventors: Brian D. Noble, Ann Arbor, MI (US); Mark D. Corner, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 775 days.

This patent is subject to a terminal disclaimer.

(21) Appl. No.: 10/608,459

(22) Filed: Jun. 27, 2003

(65) Prior Publication Data

US 2004/0073792 A1    Apr. 15, 2004

Related U.S. Application Data

(63) Continuation-in-part of application No. 10/119,204, filed on Apr. 9, 2002.

(51) Int. Cl.
*G06F 11/30* (2006.01)
*G06F 12/14* (2006.01)
*H04L 9/32* (2006.01)

(52) U.S. Cl. .................. 713/189; 713/168; 713/185; 713/190; 713/193; 726/9; 726/20; 340/5.6; 379/211.5

(58) Field of Classification Search ................ 713/193, 713/189
See application file for complete search history.

(56) References Cited

U.S. PATENT DOCUMENTS 5,012,514 A    4/1991    Renton (Continued)

FOREIGN PATENT DOCUMENTS

| EP | 0 447 386 A2 | 9/1991 |
|---|---|---|
| EP | 1 223 495 A1 | 7/2002 |
| WO | WO 95/16238 | 6/1995 |
| WO | WO 01/20463 | 3/2001 |

OTHER PUBLICATIONS

Zadok, Erez, et al., Cryptfs: A Stackable Vnode Level Encryption File System, http://cs.coleia.edu/tezk/research/crwtfs/crrtfs.html, Feb. 17, 1999, pp. 1-29.*

(Continued)

*Primary Examiner*—Matthew Smithers
*Assistant Examiner*—Shewaye Gelagay
(74) *Attorney, Agent, or Firm*—Brooks Kushman P.C.

(57) ABSTRACT

Two embodiments of a method and system to maintain application data secure and authentication token for use therein are provided. The present invention uses transient authentication, in which a small hardware token continuously authenticates the user's presence over a short-range, wireless link. Four principles underlying transient authentication are described as well as the two embodiments for securing applications. In the first embodiment, applications are protected transparently by encrypting in-memory state when the user departs and decrypting this state when the user returns. This technique is effective, requiring just seconds to protect and restore an entire machine. In the second embodiment, applications utilize an API for transient authentication, protecting only sensitive state. Ports of three applications, PGP, SSH, and Mozilla are described with respect to this API.

17 Claims, 3 Drawing Sheets

U.S. PATENT DOCUMENTS

| | | |
|---|---|---|
| 5,091,939 A | 2/1992 | Cole et al. |
| 5,226,080 A | 7/1993 | Cole et al. |
| 5,325,430 A * | 6/1994 | Smyth et al. ............... 713/192 |
| 5,375,243 A | 12/1994 | Parzych et al. |
| 5,544,321 A | 8/1996 | Theimer et al. |
| 5,611,050 A | 3/1997 | Theimer et al. |
| 5,623,637 A | 4/1997 | Jones et al. |
| 5,657,470 A | 8/1997 | Fisherman et al. |
| 5,729,608 A | 3/1998 | Janson et al. |
| 5,757,916 A | 5/1998 | MacDoran et al. |
| 5,836,010 A | 11/1998 | Kim |
| 5,889,866 A | 3/1999 | Cyras et al. |
| 6,070,240 A | 5/2000 | Xydis |
| 6,088,450 A * | 7/2000 | Davis et al. ................ 713/182 |
| 6,189,099 B1 | 2/2001 | Rallis et al. |
| 6,189,105 B1 * | 2/2001 | Lopes .......................... 726/20 |
| 6,317,500 B1 | 11/2001 | Murphy |
| 6,425,084 B1 | 7/2002 | Rallis et al. |
| 6,714,649 B1 * | 3/2004 | Masuda et al. ............... 380/44 |
| 6,792,536 B1 * | 9/2004 | Teppler ...................... 713/178 |
| 7,096,504 B1 * | 8/2006 | Tagawa et al. ............... 726/27 |
| 2002/0138748 A1 * | 9/2002 | Hung ......................... 713/190 |

OTHER PUBLICATIONS

Zadok, Erez, et al., Cryptfs: A Stackable Vnode Level Encryption File System, http://www.cs.columbia.edu/ {ezk/research/cryptfs/cryptfs.html, Feb. 17, 1999, pp. 1-29.

Prouds, N., Encrypting Virtual Memory, Proceedings of The Ninth USENIX Security Symposium, pp. 35-44, Denver, Colorado, Aug. 2000.

Stajano, F., et al., The Resurrecting Duckling: Security Issues For Ad-Hoc Wireless Networks, Securing Protocols, 7th International Workshop Proceedings, Lecture notes in Computer Science, 1999.

* cited by examiner

METHOD AND SYSTEM TO MAINTAIN APPLICATION DATA SECURE AND AUTHENTICATION TOKEN FOR USE THEREIN

CROSS-REFERENCE TO RELATED APPLICATION

This application is a continuation-in-part application of U.S. application Ser. No. 10/119,204, filed Apr. 9, 2002 and entitled "Method and System to Maintain Portable Computer Data Secure and Authentication Token for Use Therein."

STATEMENT REGARDING FEDERALLY SPONSORED RESEARCH OF DEVELOPMENT

This invention was made with Government support under Grant No. CCR-O208740 from the National Science Foundation; and Agreement No. F30602-00-20508 from DARPA and USAF. The Government has certain rights in the invention.

BACKGROUND OF THE INVENTION

1. Field of the Invention

This invention relates to methods and systems to maintain application data secure and authentication token for use therein.

2. Background Art

Unfortunately, authentication between people and their computer devices is both infrequent and persistent. Should a device fall into the wrong hands, the imposter has the full rights of the legitimate user.

Authentication requires that a user supply some proof of identity—via password, smartcard, or biometric—to a device. Unfortunately, it is infeasible to ask users to provide authentication for each request made of a device. Imagine a system that requires the user to manually compute a message authentication code for each command. The authenticity of each request can be checked, but the system becomes unusable. Instead, users authenticate infrequently to devices. User authentication is assumed to hold until it is explicitly revoked, though some systems further limit its duration to hours or days. Regardless, in this model authentication is persistent.

Persistent authentication creates tension between security and usability. To maximize security, a device must constantly reauthenticate its user. To be usable, authentication must be long-lived.

This tension has been resolved with a new model, called "transient authentication," as described in the above-noted pending U.S. patent application. In this model, a user wears a small token, equipped with a short-range wireless link and modest computational resources. This token is able to authenticate constantly on the user's behalf. It also acts as a proximity cue to applications and services; if the token does not respond to an authentication request, the device can take steps to secure itself.

At first glance, transient authentication merely seems to shift the problem of authentication to the token. However, mobile and ubiquitous devices are not physically bound to any particular user; either they are carried or they are part of the surrounding infrastructure. As long as the token can be unobtrusively worn, it affords a greater degree of physical security.

Transient authentication has been applied to cryptographic file systems, as described in the above-noted pending U.S. application, and could be extended to protect swap space, as described in N. Provos, "Encrypting Virtual Memory," PROCEEDINGS OF THE NINTH USENIX SECURITY SYMPOSIUM, pp. 35-44, Denver, Colo., August 2000. These provide a good first line of defense, protecting persistent storage from physical possession attacks. If the machine has been shutdown, hibernated, or has run out of power, this is sufficient to protect the machine from attack.

Unfortunately, they do not protect applications on machines that are running or have been suspended. An application that reads data from a cryptographic file system—or receives data from a secure network connection—holds that data in memory without protection. Mobile devices typically suspend themselves after an idle period or in response to a user closing its lid. If the device is suspended, or running, the contents of memory may be inspected through operating system interfaces or through physically probing the memory bus. An attacker can recover passwords and sensitive data such as credit card numbers, or patient records.

One solution is to require reauthentication after suspension or an idle period. This is an insufficient solution for two reasons. First, after a suspension or time-out all sensitive, in-memory data must be flushed or protected. No work has addressed this problem. Second, time-outs do not address the tension in usability versus security.

The patent document to Jones, et al., WO 95/16238, provides for a secure computer memory card. Described within is a method and apparatus for password protecting a computer. An integrated circuit incorporated within the computer's memory card may store public and private key values used to encrypt and decrypt data stored on the memory card or elsewhere on the host computer.

The U.S. Pat. No. 6,070,240, to Xydis, provides for a method of controlling a computer system comprising the steps of: disposing a computer in an operating space and placing the computer in a lockout mode to prevent operation of the computer software by a user. It also provides for a transponder that transmits an authorized user code in the operating spaced and identifying the user owning the transponder. The authorized user is then free to operate the computer software while the sensing for the presence of a transponder transmitting an authorized user code in the operating space is continued.

The U.S. Pat. No. 6,088,450, to Davis et al., provides for a wireless authentication system to control an operating state of a computer based on the proximity of an authorized user to the computer. The wireless authentication system comprises a security device implemented within the computer and a user authentication token ("token") in possession of the authorized user. A Challenge/Response protocol is configured between the security device and the token. The first successful Challenge/Response message exchange between the security device and the token places the node in an operational state allowing the authorized user access to the contents and/or networked resources of the node. Later Challenge/Response message exchanges are set to occur periodically to check whether the authorized user possessing the token has left the node unattended thereby causing the node to be placed in a non-operational state.

The patent to Jones, et al., U.S. Pat. No. 5,623,637, provides for an encrypted data storage card including smart-card integrated circuit for storing an access password and encryption keys. Disclosed within is a method and apparatus for storing access passwords, encryption or decryption keys, or digital signatures, in a smart-card integrated circuit interconnected with a data access mechanism (hard drive) which are integral parts of a memory card of a laptop or notebook computer.

The patent to Cyras, et al., U.S. Pat. No. 5,889,866, provides for a method and apparatus for controlling access to detachably connectable computer devices using an encrypted password. Of interest is a method and apparatus for controlling access to a laptop or notebook computer using an encrypted password. The laptop computer includes a utility software that prompts the user for password assignment, password entry, etc. Encryption logic encrypts the entered password and stores the encrypted password as the key on the computer. Furthermore, if the encrypted entered password is the same as the key and, thus, the entered password is the same as the assigned password, an enable signal is sent to render the computer operable.

The patent to Rallis, et al., U.S. Pat. No. 6,189,099, provides for a notebook security system (NBS). Disclosed is a multi-level security system for preventing unauthorized use of a notebook, or laptop computer. A validation record stored on the computer's hard disk contains an encrypted key device serial number and an encrypted hard disk serial number. A program that is automatically invoked at computer power-up, or reset, implements the user validation procedure. The procedure permits entry past a first security level if the key device serial number matches the unencrypted number in the validation record. If the first-level validation is successful, the procedure then uses the encryption key to decrypt the hard disk serial number found in the stored validation record. The procedure permits entry past the second security level only if the validation record is properly decrypted and the actual hard disk serial number matches the decrypted number. A failure at any step in the user-validation procedure will immediately power down the computer, thereby rendering it useless to a thief not possessing the required key device.

The U.S. Pat. No. 5,757,916, to MacDoran et al., provides for a method and apparatus for authenticating the identity of a remote user entity where the identity of such user entity is authenticated by use of information specific to geodetic location of the user entity but that changes constantly, making "spoofing" the host device extremely difficult. The invention is preferably implemented utilizing satellite positioning technology to produce the identifying information.

The U.S. Pat. Nos. 5,544,321 and 5,611,050, to Theimer, provide for a method for superimposing prespecified locational, environmental, and contextual controls on user interactions, including interactions of mobile users, with computational resources. A system is described for electronically monitoring contextual information concerning users and machines, including state and locational information including proximity. Interaction policies, including user specified interaction policies, may be registered on an identifiable address path. Methods are described for detecting, selecting and controlling computer-controlled devices, based on the proximity of the device to the user, the current context of the user, the location of other nearby users and devices, and the current state of the devices. Temporary transfer of control, including exclusive control, of particular computers and computer-controlled devices to individual users based on the context and environment in proximity to those computing devices is also described.

The following U.S. patents are also generally related to the present invention: U.S. Pat. Nos. 5,012,514; 5,091,939; 5,226,080; 5,375,243; 5,657,470; and 5,836,010.

As previously mentioned, tokens are small devices providing authentication information for the user. A user must physically possess the token to authenticate to a local or remote machine. Examples of hardware tokens include SecureID, USB tokens, and smartcards. SecureIDs require the user to read a password from the token and type it into the device they are authenticating to. They utilize one-time passwords solving the problems that traditional password systems have. USB tokens and smartcards are inserted into the device and either transfer authentication information to the machine or must remain attached for continued operation.

Unfortunately, tokens suffer from a fundamental weakness in reauthentication. The user must frequently reauthenticate, or manually logout to ensure that the device has not been stolen while authenticated, thus caching credentials. Constant reauthentication can be accomplished by attaching the token to the device. Unfortunately, this encourages a user to leave the token with the device, providing little protection.

Several efforts have used proximity-based hardware tokens to detect the presence, or absence, of an authorized user. One person proposes disabling hardware access to the keyboard and mouse of a machine when the trusted user is away. A commercial alternative, Xy-Loc, has a software-based guard on the protected machine that refuses access when the token is absent. These systems approximate transient authentication, but do not adhere to its first principle, as described hereinbelow. The capability to act in these systems does not reside on the token; the token is merely advisory. Since the computing system is still capable of carrying out a sensitive operation, it could be forced to do so. Sensitive operations may be relegated to a secure coprocessor, rendering these physical attacks more difficult.

Rather than use hardware tokens, one could instead use biometrics. However, biometric authentication schemes intrude on users in two ways. The first is the false-negative rate: the chance of rejecting a valid user. For face recognition, this ranges between 10% and 40%, depending on the amount of time between training and using the recognition system. For fingerprints, the false-negative rate can be as high as 44%, depending on the subject. The second intrusion stems from physical constraints. For example, a user must touch a special reader to validate his fingerprint. Such burdens encourage users to disable or work around biometric protection. A notable exception is iris recognition. It can have a low false-negative rate, and can be performed unobtrusively. However, doing so requires three cameras—an expensive and bulky proposition for a laptop.

For transient authentication to succeed, a computing device must forget sensitive information, typically through encryption, as described in the above-noted parent application. Thereafter, only the token can provide the key to recover this information. Such techniques have also been applied to revocable backups and secure execution of batch jobs, and are sometimes referred to as non-monotonic protocols. It can be difficult to completely erase previously stored values, whether in memory or on disk. However, given a small amount of easily erasable media, one can solve this problem for a much larger, more persistent store.

ZIA, a cryptographic file system, uses transient authentication for file data protection, as described in the above-noted parent application. ZIA imposes overheads of less than 10% for representative workloads, and imposes no new usability burdens. Unfortunately, ZIA does not protect data once an application has read it. Application data that is paged out can be protected, leaving only in-memory state vulnerable to attack.

As described in F. Stajano and R. Anderson, "The Resurrecting Duckling: Security Issues for Ad-hoc Wireless Networks," SECURITY PROTOCOLS, 7TH INTERNATIONAL WORKSHOP PROCEEDINGS, Lecture Notes in Computer Science, 1999, the Resurrecting Duckling security policy proposes a set of policies for binding wireless devices to an owner. Laptops and tokens are bound by a user action, and trusted until a timeout period. In the duckling parlance, the binding process is "imprinting" and the authentication timeout causes token "assassination."

As described in B. A. Miller and C. Bisdikian, "Bluetooth Revealed," Prentice Hall, Upper Saddle River, N.J. 2001, Bluetooth uses similar techniques to "bond" two devices in a trust relationship and bonds can be removed manually.

The following documents are also related to the present application: U.S. Pat. No. 6,189,105; WO 01/20463; EP 0 447 386; EP 1 223 495; and Zadok I. Badulescu and A. Shender, "Cryptfs: A Stackable Vnode Level Encryption File System," http://www.cs.columbia.edu/{ezk/research/cryptfs/cryptfs.html, Online! 17 Feb. 1999, pp. 1-25.

In summary, mobile and ubiquitous devices are susceptible to loss or theft, leaving the state of running applications vulnerable to data exposure. Current methods of authentication do not solve this problem since authentication is both infrequent and persistent.

SUMMARY OF THE INVENTION

One aspect of the present invention is to provide an improved method and system to maintain application data secure and authentication token for use therein wherein applications on machines that are running or have been suspended are protected.

Another aspect of the present invention is to provide an improved method and system to maintain application data secure and authentication token for use therein wherein in-memory state is protected.

Yet another aspect of the present invention is to provide an improved method and system to maintain application data secure and authentication token for use therein wherein the capability to read sensitive data from memory is constantly reaffirmed while giving the user no substantial reason to turn protections off.

In carrying out the above objects and other objects of the present invention, a system to maintain application data stored on a portable computer secure is provided. The system includes an authorization client for use on the portable computer for making requests. The portable computer is capable of providing in-memory portions of address space for an application program. A security device is associated with an authorized user of the portable computer and includes an authorization server for supplying responses to the requests. A communication subsystem wirelessly communicates the requests and the responses to the server and the client, respectively, within a range. A cryptographic subsystem encrypts data located in the in-memory portions of the address space to obtain corresponding encrypted data when the security device is outside the range of the communication subsystem and decrypts the encrypted data when the security device is back within the range.

The requests may include cryptographic requests for cryptographic information, and the server may supply the cryptographic information in response to the cryptographic requests. The cryptographic subsystem may utilize the cryptographic information to either encrypt or decrypt the data.

The system may further include means for suspending substantially all authorized user processes on the computer when the security device is outside the range, and means for restarting the suspended authorized user processes on the computer when the security device is back within the range.

The cryptographic information may include keys, and the keys may be encrypted.

The system may further include means for suspending selected authorized user processes on the computer when the security device is outside the range, and means for restarting the selected authorized user processes on the computer when the security device is back within the range.

The system may further include a mechanism for establishing a binding between the portable computer and the security device to ensure that the security device only responds to a portable computer with a valid binding.

The security device may be an authorization token.

The keys may include at least one master key, which may be a key-encrypting key.

The cryptographic subsystem may include encrypted keys, and the cryptographic information may include keys for decrypting the encrypted keys.

Further in carrying out the above objects and other objects of the present invention, a method to maintain application data stored on a portable computer secure is provided. The method includes providing an authorization client for use on the portable computer for making requests. The portable computer is capable of providing in-memory portions of address space for an application program. A security device is provided to be associated with an authorized user of the portable computer and includes an authorization server for supplying responses to the requests. The requests and the responses are wirelessly communicated to the server and the client, respectively, within a range. The method further includes encrypting data located in the in-memory portions of the address space to obtain corresponding encrypted data when the security device is outside the range, and decrypting the encrypted data when the security device is back within the range.

The method may further include suspending substantially all authorized user processes on the computer when the security device is outside the range and restarting the suspended authorized user processes on the computer when the security device is back within the range.

The requests may include cryptographic requests for cryptographic information, and the server may supply the cryptographic information in response to the cryptographic requests. The cryptographic information may be used to either encrypt or decrypt the data.

The method may further include establishing a binding between the portable computer and the security device to ensure that the security device only responds to a portable computer with a valid binding.

The method may further include suspending selected authorized user processes on the computer when the security device is outside the range and restarting the selected authorized user processes on the computer when the security device is back within the range.

The cryptographic information may include keys, and the keys may include at least one master key.

The at least one master key may be a key-encrypting key.

Still further in carrying out the above objects and other objects of the present invention, an authorization token is provided for use in a system to maintain application data stored in in-memory portions of address space on a portable computer secure. The token includes an authorization server for supplying encrypted responses to encrypted requests. A transceiver is provided for receiving the requests and transmitting the responses to the portable computer.

The requests may include cryptographic requests for cryptographic information, and the server may supply the cryptographic information in response to the cryptographic requests.

The cryptographic information may include keys, and the keys may be encrypted.

The keys may include at least one master key.

The at least one master key may be a key-encrypting key.

The above aspects and other aspects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
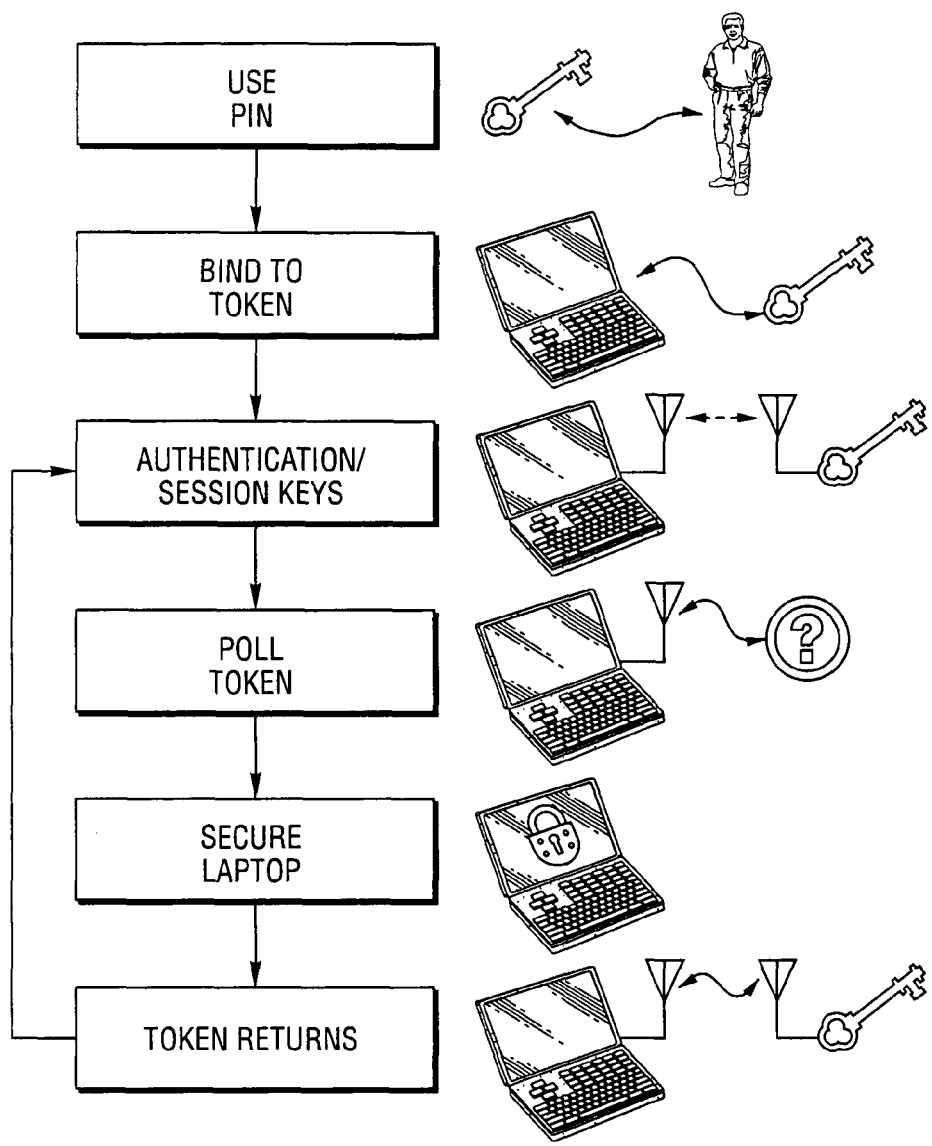
FIG. 1 is a block diagram flow chart which illustrates the operation of a token authentication system; this figure shows the process for authentication and interacting with the token; once an unlocked token is bound to a device, it negotiates session keys and can detect the departure of the token.

Initially, a trust and threat model is considered and the four principles underlying transient authentication are enumerated. Then, two embodiments of the present invention for protecting in-memory application state are described.

The first embodiment of the present invention entitled "application-transparent protection" provides protection within the kernel. When the user departs, all user processes are suspended and in-memory pages encrypted. When the user returns, pages are decrypted and processes restarted. Protection and recovery processes each take at most ten seconds on hardware, and applications need not be modified to benefit from the method and system of the first embodiment.

Application-transparent protection is effective but indiscriminate. There are processes that can safely continue in the user's absence, and a few processes may be able to selectively identify and protect sensitive state. The second embodiment of the invention entitled "application-aware protection" supports such applications. An API is provided for applications to use transient authentication services directly. Three applications, PGP, SSH, and Mozilla are provided to make use of this API. In exchange for such modifications, these applications are protected and restored in well under half a second, and suffer no noticeable degradation of run-time performance.

Trust and Threat Model

One focus of the method and system of the present invention is to defend against attacks involving physical possession of a device or proximity to it. Possession enables a wide range of exploits. The easiest attack is to use authentication credentials that are cached by the operating system or individual applications. Even without cached credentials, console access admits a variety of well-known attacks; some of these result in root access. A determined attacker may even inspect the memory of a running machine using operating system interfaces or hardware probing.

Transient authentication must also defend against observation, modification, or insertion of messages sent between mobile devices and the token. Simple attacks include eavesdropping in the hopes of obtaining sensitive information. A more sophisticated attacker might record a session between the token and laptop, and later steal a misplaced laptop in the hopes of decrypting prior traffic. These attacks can be defined through the use of well-known, secure protocols.

Transient authentication's security depends on the limited range of the token's radio. Repeaters or arbitrarily powerful transmitters and receivers could be used to extend this range. This is sometimes called a Wormhole attack. The rapid attenuation of high frequency radio signals makes attacks using powerful transmitters difficult in practice. A better solution would use timing information to detect the distance of the token from the device. This technique has been proposed by others and explored in the Wormhole detection project, though neither has built a practical implementation.

Transient authentication does not defend against a trusted but malicious user who leaks sensitive data. It also does not consider network-based exploits to gain access to a machine, such as buffer overflow attacks. Finally, it does not protect against denial of service attacks that jam the spectrum used by the laptop-token channel. Other attacks may attempt to exhaust the energy resources on the token. This can be addressed by reserving most resources on the token to deal with trusted connections.

The device operating system must be trusted. If the operating system has been compromised, secret information could be revealed to a third party. Protecting an operating system from modifications, such as Trojan horses, has been addressed in other work. It must be assumed that if the device is stolen and used maliciously in any way, it will never again be used as trusted. Any device that has been out of the user's control for a lengthy period of time should be treated as suspect and not used.

Transient Authentication Principles

Transient authentication is governed by a set of four guiding principles. First, users must hold the sole means to access sensitive resources or invoke trusted operations on the device. Second, the mechanisms to secure sensitive data do not need to be faster than people using them. Third, the system must impose no additional usability or performance burdens. Fourth, users must give explicit consent to actions performed on their behalf. This list is a refined version of principles that appeared in earlier work.

Tie Capabilities to Users

The ability to perform sensitive operations must ultimately reside with the user rather than her devices. For example, the keys that decrypt private data must reside on the user's token, and not on some other device.

At the same time, it is unlikely that the token—a small, embedded device—can perform large computations such as bulk decryption. Furthermore, requiring the token to perform cryptographic operations in the critical path of common actions will lead to unacceptable latency. In such cases, it may be necessary to cache capabilities on a device for performance. The results of the cryptographic operations can be cached. However, these decrypted capabilities must be destroyed when the user leaves, and the master capability cannot be exposed beyond the token.

One could instead imagine a simple token that responded to authentication challenges. This gives evidence of the user's presence but does not supply a cryptographic capability. An operating system could use this evidence to govern access to resources, data, and services. Unfortunately, this model is insufficient. If the device is capable of acting without the token, then an attacker with physical possession can potentially force it to do so. For example, consider memory access control. The operating system can be forced to provide the contents of physical memory through OS interfaces such as Linux's/dev/mem and Windows' \Device\PhysicalMemory. An encrypted memory store, with the keys stored only on the token, is not subject to the same attack.

Cached capabilities—and the data they protect—can only remain while the token is present; when the token is out of range, sensitive items must be protected. As a simple example consider a cryptographic file system. If the user leaves, an attacker could physically attack the machine, recovering the disk cache. Even if the disk is encrypted, the decryption key can be found in memory. Instead, the disk cache must be protected and the keys flushed from the system.

Secure Just Faster Than People

The securing process must happen before an attacker gains access to the machine. One might think that this must happen quickly. However, since people are slow, the limit is on the order of seconds, not milliseconds.

Suppose that a malicious individual wishes to compromise a device. After stealing the device, he must take advantage of persistent authentication information. For example, a user logs in and leaves a laptop, an attacker can take the device and prevent the machine from protecting itself, reading the contents of memory at his leisure. The amount of time required for such a physical attack depends on a variety of human factors.

Some optimizations in the securing process can be made to ensure that recovery is fast enough. Rather than simply erasing sensitive information during the securing process, one might prefer to encrypt and retain it. This additional work can save time on restoration: when the user returns, the laptop can obtain the proper key from the token and decrypt the data in place, restoring the machine to pre-departure state. As long as the additional work to secure the machine is within tens-of-seconds, this is an acceptable tradeoff.

Do No Harm

Investing capabilities with users increases the security of the system. However, increases in security cannot impose additional burdens. When faced with inconvenience, however small, users are quick to disable or work around security mechanisms. Both performance and usability must remain unaffected.

Users already accept infrequent tasks required for security. For instance, passwords are used occasionally, usually on the order of once a day. More frequent requests for passwords are perceived as burdensome; a transparent authentication system can impose no usability constraints beyond those of current systems.

Transient authentication must also preserve performance, despite the additional computation increased security requires. As long as this computation is imperceptible to the user, it is an acceptable burden. For example, the Secure Socket Layer (SSL) protocol requires processing time for encryption and authentication. However, this cost is masked by network latency.

When the user returns after being away, the device must return itself to the pre-departure state. This includes user visible state such as open windows, and network connections, as well as pre-departure performance. If information was flushed, or protected using encryption, it must not take a visible amount of time to recover. Users who are forced to wait for recovery to finish are less likely to use the system.

Ensure Explicit Consent

Tokens and devices must interact securely, and with the user's knowledge. In a wireless environment, it is particularly dangerous to carry a token that could provide capabilities to unknown devices autonomously. A "tailgating" attacker could force another user's token to provide capabilities, nullifying the security of the system. Instead, the user must authorize individual requests from devices or create trust agreements between individual devices and the token.

Theoretically, users could confirm every capability requested by the device. However, usability is paramount, so the granularity of authorization must be much larger. Instead of an action-by-action basis, user consent is given periodically on a device-by-device basis.

To ensure explicit consent, the model provides for the binding of tokens to devices. Binding is a many-to-many relationship; one might interact with any number of devices, and any number of users might share a device. Binding requires the user's assent but can be long-lived, limiting the usability burden. The binding process requires mutual authentication between device and token.

Unfortunately it is possible for a user to lose a token. Token loss is a serious threat, as tokens hold authenticating material; anyone holding a token can act as that user. To guard against this, users must periodically authenticate to the token. This authentication can be persistent, on the order of many days. This return to an unbound state is similar to what others call reverse metempsychosis. Nominally, any authenticating material in the token is encrypted by a user-supplied password. When the authentication period expires, the token flushes any decrypted material, and will no longer be able to authenticate on the user's behalf. Placing authentication material in PIN-protected, tamper-resistant hardware further strengthens the token in the event of loss or theft. The transient authentication process, illustrating all of these mechanisms, is shown in FIG. 1.

Application-Transparent Protection

Applications store sensitive information, such as credit card numbers and passwords, in their virtual address space. Even with an encrypted file system and swap space, the in-memory portions of an application's address space are vulnerable to attack. The memory bus or chips may be probed by a knowledgeable attacker, or OS interfaces can be exploited to examine raw memory contents. This section describes a technique, called application-transparent protection, for protecting in-memory process state. The main benefit of this technique is that it protects processes without modification. The application designer does not need to identify which data structures contain secret data and users do not have to designate which processes to protect.

Design

Applying the first stated goal of transient authentication requires that the capability of reading memory be tied to the user. One approach would be to require each load and store to use encryption, using keys only available on the token. The performance of the machine would suffer greatly, clearly violating the principle of "do no harm." An alternative would be to protect the machine by flushing the contents of memory into the swap space and zeroing in the memory whenever the user departs. This scheme would make use of swap space encryption, combined with keys available only on the token. On return, the paged-out memory would be read back from the disk into the memory pages. Unfortunately, both protecting and maintaining the machine would require a significant amount of overhead in disk operations, leaving the machine vulnerable longer and burdening the user. This would violate the principles of "securing just faster than people" and "do no harm."

Instead, the system must encrypt the virtual memory of processes in place. Since all the encryption operations are done in memory, this mechanism provides both fast protection and recovery. To avoid corrupting the encrypted memory, processes must first be placed in a hibernation state, preventing them from executing while the user is away. Certain processes can be designated as unprotected, but most processes will not execute until the user returns. On recovery, the memory is decrypted and the process is re-animated; to a returning user it appears as if nothing has changed.

The recovery process is fast enough to remain unnoticed by users. However, if the ratio of memory size to processing speed were much greater, the securing or recovery process may be too lengthy. In this case, the application-aware techniques presented herein below will be required. If recovery is the bottleneck, it is possible to first recover applications the user will interact with quickly. Operating systems already track interactive jobs to provide good response time in process scheduling, enabling informed selection of recovery order. However, it is expected that the current memory/processor balance will continue for the foreseeable future making this technique unnecessary.

Implementation

A Linux prototype has been built to protect the in-memory portions of application state. At startup, an in-kernel module receives a fresh key from the token to govern the memory of running processes. The module receives notifications of the token's status from another in-kernel module. When it receives notification of user departure, each process is set to hibernate, using techniques borrowed from the Linux Software Suspend project. First, each process is marked as hibernating and also as having a pending signal. The only processes allowed to continue running are essential tasks related to transient authentication and the operating system. The marked processes are woken up and the kernel signal dispatcher prevents the process from running until the hibernate flag is cleared. This ensures that every process is in a known hibernating state and cannot change its own memory. This has the property of having to wait for uninterruptible processes to become interruptible. However, processes normally last in this state only for a short time. It may be the case that a buggy process has become stuck in an uninterruptible state. Other hibernation methods may exist.

After hibernation is complete, the module walks the virtual memory space of each process, looking for in-memory pages. Each in-memory page is encrypted using the pre-fetched key, and marked as such to prevent multiple encryptions of shared memory pages. The decrypted copy of the key is then thrown away. On user return, the process is reversed—the kernel fetches a decrypted version of the key from the token, the memory is decrypted and all processes are awoken from where they left off.

Free memory pages present a special difficulty. Applications may have allocated memory, stored secret information in that space, and then terminated. This memory is returned to the OS, and it may still contain remnants of that information. To protect these remnants, the module must walk the list of free pages and zero the memory of each page in the list.

Figure 2:
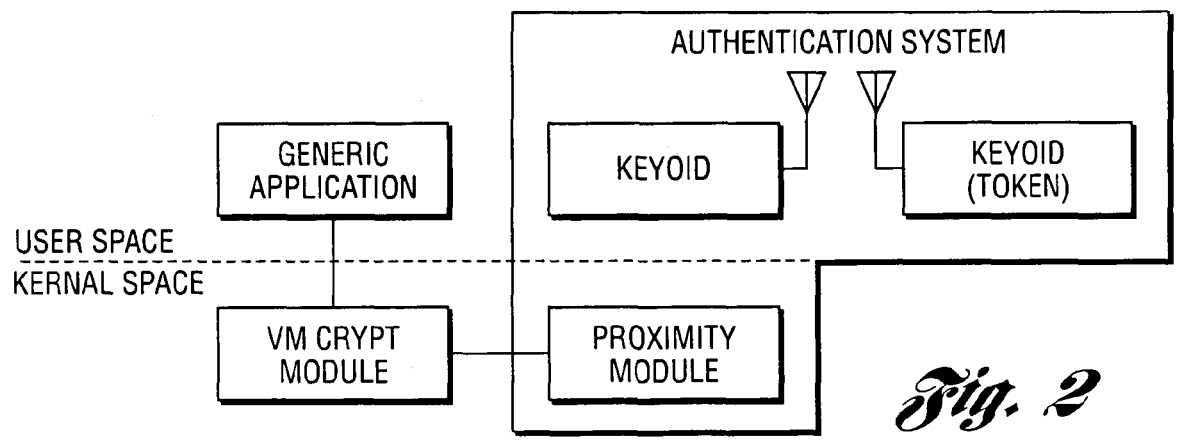
FIG. 2 is a schematic block diagram illustrating "transparent protection" of the present invention; this figure shows the components in the transparent protection system; when authentication is lost, a kernel module encrypts the in-memory state of any generic application; authentication and token communication are handled by a kernel proximity module and a user space daemon.

An overview of the transparent protection system is shown in FIG. 2. Fetching the encryption key from the token is handled by a pair of user space daemons, keyiod on the laptop and keyd on the token, communicating via a wireless link. Both keyiod and keyd are written in C, and keyd is compiled for the StrongARM processor used by the iPAQ. The laptop client, keyiod, is multithreaded to allow multiple outstanding requests, decreasing the latency of multiple requests. The token process, keyd is primarily compute bound and does not require acknowledgment, permitting a single threaded design.

Exposure of the virtual memory encryption key would nullify its protections, so each message between keyiod and keyd must be encrypted. Further, since the token is used to create fresh encryption keys, the link must be authenticated as well.

The kernel module, tadev also exports an interface for other OS services to utilize the token. The tadev module provides three functions: sendmessage, addhandler, and removehandler. This allows generic modules to send messages as well as register, and unregister to receive messages of requested types. Modules can send requests for capabilities, receive responses, as well as be informed of events such as loss of authentication.

Mutual authentication can be provided with public-key cryptography. In public-key systems, each principal has a pair of keys, one public and one secret. To be secure, each principal's public key must be certified, so that it is known to belong to that principal. Because laptops and tokens fall under the same administrative domain, that domain is also responsible for certifying public keys. Keyiod and keyd use the Station-to-Station protocol, which combines public-key authentication and Diffie-Hellman key exchange.

Each message include a nonce, a number that uniquely identifies a packet within each session to prevent replay attacks. In addition, the session key is used to compute a message authentication code, verifying that a received packet was neither sent nor modified by some malicious third party.

The kernel cryptographic module must be informed when the token is no longer present. To provide this notification, a periodic challenge/response is added between the laptop and the token. These proximity polling messages are generated by a second module in the kernel. The interval may be set to one second; this is long enough to produce no measurable load, but adds little the amount of time needed to protect the laptop.

Application-Aware Protection

Transparent application support is an effective technique, but an indiscriminate one. There are several disadvantages in protecting every process on the machine, regardless of the sensitivity of their contents. A process that only occasionally conducts sensitive operations must be completely stopped, regardless of its current tasks. Certain processes could be statically designated as sensitive, or the process could mark itself as sensitive dynamically. However, if two processes communicate through shared memory, both must be stopped, even though only one may be sensitive. Also, some applications that depend on constant input or network traffic may not survive the hibernation process. This burdens the user, who must either restart those applications or perform work to restore the previous state.

To combat these shortcomings, an interface for an application is provided to manage its own sensitive information. This allows greater flexibility in handling loss of authentication and permits the application to continue to run regardless of authentication state. An application programing interface, or API, allows applications to use transient authentication services. Applications must be restructured to depend on capabilities, such as keys, held by the token. For performance, these capabilities can be cached, but they must be flushed when the token leaves.

Some applications and services already manage authentication and access to sensitive resources. Most of these systems revoke access through either explicit user logout or expiration of a long-lived session. Some of these applications and servers also, provide various levels of service, depending on the specific credentials of the user. Such applications already manage identity and privilege, and would benefit from direct use of transient authentication services.

Figure 3:
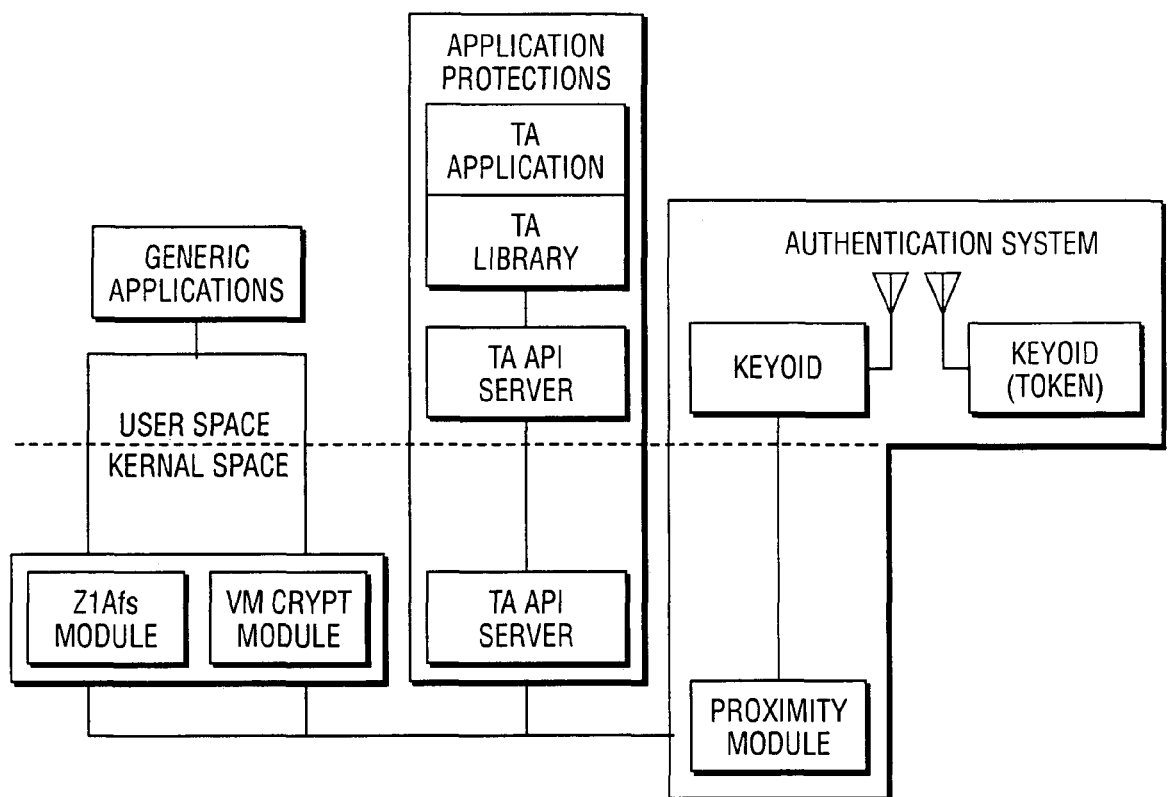
FIG. 3 is a schematic block diagram illustrating transient authentication (i.e., TA) components; this figure shows the various components used in the transient authentication system of the present invention; generic applications can be protected by the virtual memory encryption system and the ZIA file system; modified applications are compiled with a transient authentication library and communicate with the kernel through a user-space server; all communications with the token go through a proximity polling module and a user-space communication daemon.

An overview of the system is shown in FIG. 3. Generic applications can take advantage of transient authentication using transparent protection. Modified applications are compiled with a transient authentication library and communicate with the kernel using a user-space server. All interactions with the token pass through the proximity polling module and a user-space communication daemon. Parts of the system in the kernel have been implemented to make the system fail-safe. If any part of the system fails, the application should still receive a notice of authentication loss.

Protecting Targeted Secrets

Identifying secret data is the most difficult part of protecting an application. The application designer must first consider the threat model and user requirements. For instance: is all of the user's data secret? What about the meta-data? What about data received from the network? For example, the text of a word processor document is probably private, the formatting of that document may or may not be, and the state of local program variables is probably not. There are no hard rules for determining these classifications and it must be left to the designer of the application.

Once secrets have been identified, we use two different mechanisms to tie capabilities to the token. The first is to detect when the user leaves, then encrypt secrets and forget the local copy of the key. When the user returns, that key can be retrieved from the token and the secret decrypted. The second is to always store the information encrypted, and decrypt it for every short term use.

Choosing which mechanism to use depends on the properties of the data, including size and frequency of use. Accessing and restoring secrets must not take a noticeable amount of time, and protection must be done "just faster than people." In some cases, both of the mechanisms conform to the principles of transient authentication, allowing the programmer to pick the more convenient option.

Application Programming Interface

Before a user starts an application that employs the transient authentication API, that user must have one or more master keys for that application installed on their token. In this implementation, master keys are 128-bit AES keys. These keys should be installed by an administrative authority, and should not be exposed beyond the token. The master key is typically used as a key-encrypting key, but can sometimes protect small data items directly. Once a key is installed, the API is available. It is summarized in the following listing:

```
/* Register an application with the library */
int ta_application_reg          (IN char*app_name,
                                 IN char* username);
typedef
enum ta_change{TA_LOSS, TA_GAIN} ta_change+t;
typedef
int (* ta_auth_hdlr_t )         (IN ta_change_t change,
                                 In int flags );
/* Register a handler for change in authentication */
int ta_auth_change_reg          (IN int appid,
                                 IN ta_auth_hdlr_t hdlr);
typedef char*ta_keyname_t;
/* Decrypt a buffer on the token with a key */
int ta_decr_buf                 (IN int appid,
                                 IN ta_keyname_t keyid,
                                 IN char* inbuf,
                                 IN size_t inlen,
                                 OUT char** outbuf,
                                 OUT size_t* outlen );
/* Encrypt a buffer on the token with a key */
int ta_encr_buf                 (IN int appid,
                                 IN ta_keyname_t keyid,
                                 IN char* inbuf,
                                 IN size_t inlen,
                                 OUT char** outbuf,
                                 OUT size_t* outlen );
```

This listing shows the API for transient authentication. Three types of functions are included: registration with the user-space server, registration of authentication call-back functions, and buffer decryption using the token and previously registered key.

On startup, each protected application registers itself with the API, providing its name and the user running it. Usernames are chosen to provide flexibility in token identities. There is no reason why this username cannot be a UID, or some other identity. The application then installs a handler. The handler is called when the token fails to respond to a request, revoking authentication, or when a departed token once again is in range, reestablishing authentication.

Each master key acts as the capability to perform sensitive actions on behalf of its user and application. Simple examples of such actions are reading cached passwords or credit card numbers. These items are small; it is feasible to ship encrypted copies of them to the token, decrypt them, and send them back. This can be done directly with ta_encr_buf and ta_decr_buf. The application may decrypt and cache such items, but must clear them when notified of token departure.

As implemented, the token contains a separate master key for each application. However, this is flexible and individual master keys could cover multiple applications, although this sacrifices the key isolation provided by separate keys. Although master keys are never exposed outside the token, bugs in applications could lead to possible attacks on the master keys. Also, these master keys should be escrowed by an administrative authority if they are used for any persistent, non-recoverable data. A similar escrow policy was proposed in the ZIA file system of the parent application.

Some things cannot be handled with direct encryption and decryption. Passing large data elements directly to the token for decryption would likely impose too great of a performance penalty. To protect large elements, the application must first create a sub-master key. Sub-master keys cover large objects. Encrypted copies of the sub-master can be stored at any time, while decrypted copies can be kept only while authentication holds. A preferred idiom for creating sub-master keys is to choose a random number as the encrypted key, and have the token "decrypt" it. Although the system needs to check for resulting weak keys, this ensures that a secret key is never generated without the token's involvement.

On startup, applications do not hold any sensitive data; they must first either decrypt an item or obtain a derived key. These decryption requests will fail if the token is out of range, leaving the application in a safe state. Once the first item or key is successfully decrypted, the user is considered authenticated. Thereafter, the run time system tracks the token's comings and goings, reporting them to registered handler. The next three sections describe how three user applications were modified to use the API.

Pretty Good Privacy (PGP)

Pretty Good Privacy, or PGP, uses the RSA asymmetric encryption algorithm to digitally sign and encrypt data. Users possess a pair of keys, one public and one private. Data can be encrypted using the public key and only someone who knows the private key can decrypt it. The private key can also be used to sign the message, and anyone can verify the signature using the public key. PGP can be used to provide data integrity and privacy to a great variety of applications, however, the focus here is on email.

Figure 4:
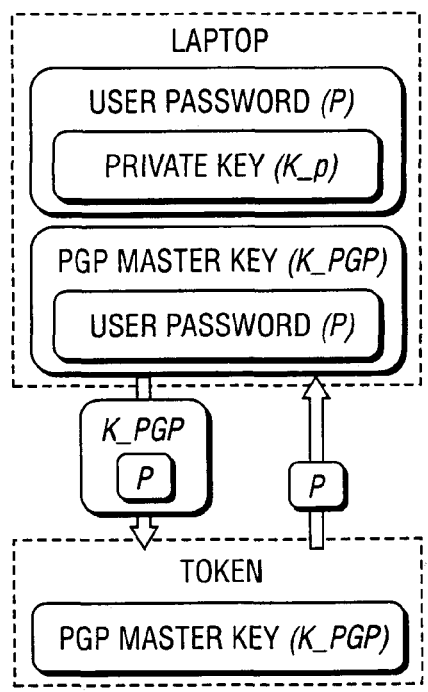
FIG. 4 is a schematic block diagram illustrating PGP modifications; the private key, $K_p$, of the user is protected by a password, P; P is encrypted by $K_{PGP}$, which is only known to the token; each time PGP needs to use $K_p$, it asks the token to decrypt P, which enables the laptop to decrypt $K_p$.

The most valuable secret held by PGP is the user's private key, $K_p$. Commonly, $K_p$ is protected by a user's password, P, denoted as $P\{K_p\}$. When using an email client, such as Pine, the user is prompted for the password on each signature or decryption operation. In adding transient authentication services to PGP the original semantics of the application are preserved and minimize modifications. $K_p$ is protected with a random password, P, encrypted by a key on the token, $K_{PGP}$. This chain of keys is written as $K_{PGP}\{P\}, P\{K_p\}$. The modifications made to PGP are summarized in FIG. 4.

When a user asks PGP to decrypt or sign a piece of email, the private key, $K_p$, is required. PGP reads both $K_{PGP}\{P\}$ and $P\{K_p\}$ from the user's PGP key directory. It sends a decryption request to the token containing $K_{PGP}\{P\}$ and the token return P. P is used to decrypt $K_p$ and is then thrown away. The signing or decryption process uses $K_p$ for as long as the operation takes, and the token is no longer needed.

Email encryption and decryption is a short process. To keep the modifications to PGP as simple as possible, any loss of authentication while using the private key causes the process to exit. Any secrets contained in freed memory can be protected by the zeroing of free pages in the transparent protection kernel.

A mail program, such as pine, must employ PGPs output with care. For instance, if decrypted messages are displayed to the screen, the mailer must take steps to obscure that data upon loss of authentication. One possible mechanism would be to reset the display to the message index. Another option would be to redisplay the encrypted form of the message and recover the decrypted version when the user returns.

OpenSSH

Figure 5:
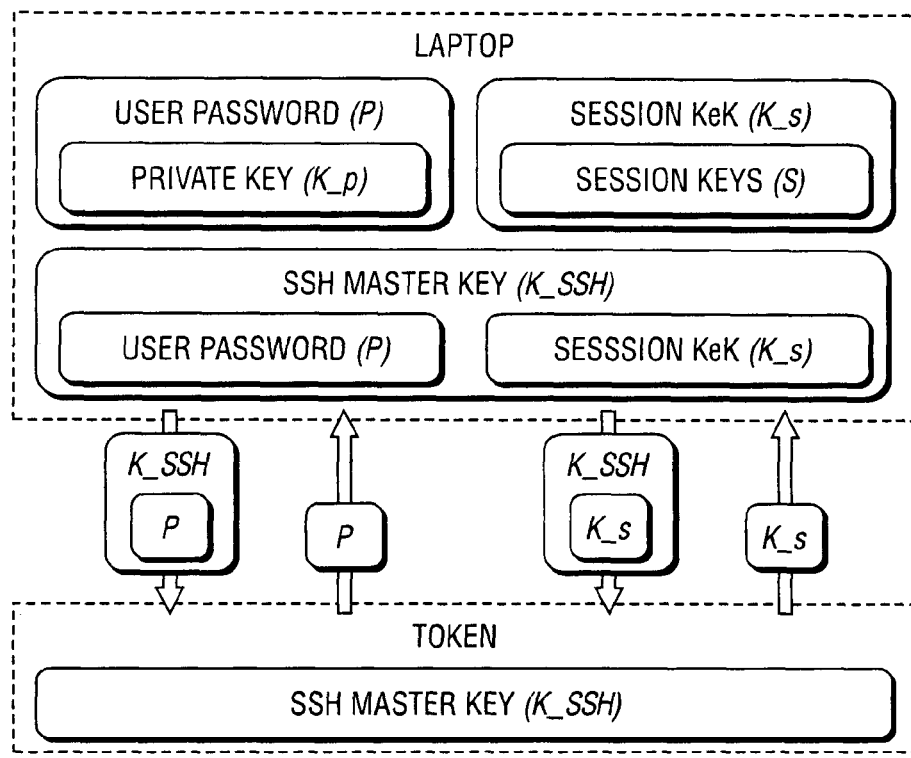
FIG. 5 is a schematic block diagram illustrating the modifications made to OpenSSH; the user's private authentication key is protected by a password P, which is encrypted by a key $K_{SSH}$; when the user is not present, the session keys, S, are encrypted by a session key encrypting key $K_s$, which is encrypted by $K_{SSH}$, as well; when OpenSSH needs to authenticate, it uses the token to decrypt P, giving it access to $K_p$; similarly, when the user returns, the token is used to decrypt $K_s$, giving access to the session keys.

The Secure Shell suite of tools provides authenticated and encrypted equivalents for rsh and rcp, called ssh and scp. Client applications authenticate servers based on public key cryptography. Servers authenticate users based on passwords or public keys. Data transmitted during the session is encrypted using a key exchanged in the authentication stage. An open-source secure shell, OpenSSH, has been modified; a summary of the modifications is shown in FIG. 5.

OpenSSH contains two secrets that need protection, the private key, $K_p$, used for authentication, and the session key, S, used to encrypt data. The private key is covered by the same methods as PGP—the password, P, for $K_p$ can be decrypted by the token's $K_{SSH}$.

The authentication phase generates the session key, S, which is cached. Before the session continues, OpenSSH must protect the session key. First, OpenSSH creates a new "encrypted" key, $K_{SSH}\{K_s\}$. It then uses the token to decrypt the encrypted key, yielding $K_s$. Finally, OpenSSH uses $K_s$ to create an encrypted version of the session key, denoted $K_s\{S\}$, which it caches.

While the user remains present, S remains decrypted in memory for session encryption and decryption. If a disconnection notification is received, OpenSSH flushes both S and $K_s$, but retains $K_s\{S\}$ and $K_{SSH}\{K_s\}$. When the user returns, Open$_{SSH}$ must decrypt $K_s$ using the token. It can then decrypt S and continue the session.

Each use of the session key requires a simple check that S is still available. This check takes a small amount of time, slowing data transmission by a negligible amount. If S is encrypted, the transmission of data blocks, and received data is held in the network buffer—still encrypted—until the user returns. Any blocked sessions are resumed where they left off. It may be possible for unencrypted data to get passed between the terminal and SSH after a disconnection. A method to prevent this from happening includes locking the keyboard first, rejecting all data from the terminal, or returning an error to the pipe.

Mozilla Web Browser

Web browsers provide secure access to online accounts, e-commerce, and web-based email. Consider a typical session for accessing a secure web server at a bank. First, the browser creates a Secure Socket Layer (SSL) session with the bank's server. SSL provides session encryption to an authenticated server. The user authenticates himself by typing an account number and password into a web form. The browser often caches this information to make future logins easier. The server then sets a cookie on the user's local machine to authenticate future requests during this session. SSL can provide for client authentication, but the vast majority of sites use cookies instead. Web pages, such as an account statement, can now be retrieved from the server and remain available in the browser's memory cache. This example identifies several places where secret information resides in the browser's address space: SSL session keys, cached passwords, cookies and the memory cache of the browser.

Figure 6:
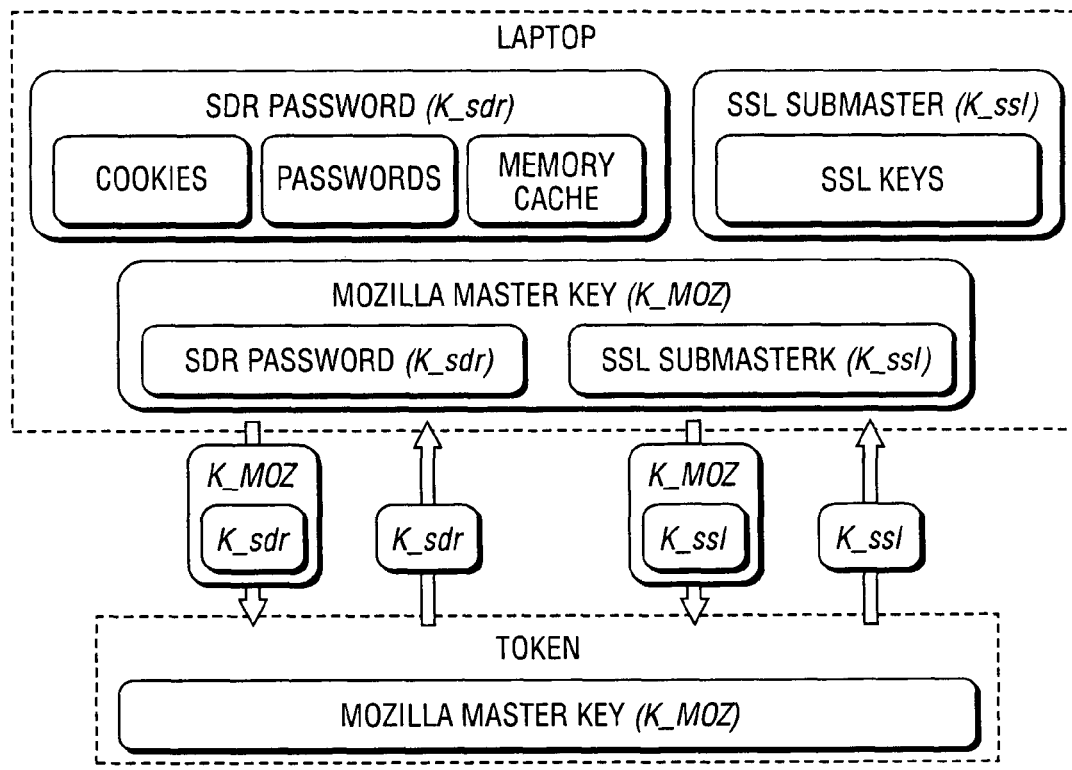
FIG. 6 is a schematic block diagram illustrating the modifications made to the Mozilla web browser; cookies, passwords and the memory cache, all depend on Mozilla's Secret Decoder Ring for encryption and decryption; the password for the ring can be accessed using the token; SSL operates in the same way, and the sub-master key used to encrypt SSL keys can be obtained using the tokens.

Transient authentication has been added to the Mozilla web browser. Mozilla is a large and complex piece of software, containing more than 250 MB of code and using several different programming languages. Some effort was made in the original source code to separate confidential and non-confidential data; however, this mostly pertained to secret keys themselves and not to sensitive data such as cookies and the memory cache. Mozilla also includes a module, the Secret Decoder Ring (SDR), that can be used to encrypt and decrypt arbitrary data. The SDR module depends on a user login to explicitly provide a decryption key. This provides an ideal location to add transient authentication to the system. SSL keys are contained in the same module as SDR, and therefore SSL uses these internal encryption functions, rather than the external interface. A diagram of the components in the modified browser is shown in FIG. 6.

SSL session keys are used frequently, so it would be inefficient to decrypt them on every use. Instead they remain decrypted until a token departure; they are then encrypted in-place. SSL session keys could be flushed and recreated when the user returns, however to replicate the current semantics one keeps the SSL session open.

Cached passwords are used very infrequently and can be stored on disk. In this case, it.makes sense to have SDR decrypt the information each time it is used—Mozilla already has this capability. Cookies are used more frequently than stored passwords, but less than SSL keys. Thus, either method could be used. One can choose to leave them encrypted and decrypt them using SDR on each use. This overhead is tolerable. The web cache is split into two parts, an in-memory cache and an on-disk cache. Mozilla's policy is to store data from SSL connections only in memory and never on disk. All non-SSL data is considered to be previously exposed on the network and is not protected, although there is nothing that precludes protecting this via file system encryption. The items in the memory cache are potentially large in size and frequently accessed. However, the memory cache is of limited size and can be encrypted in bulk very quickly. Thus to protect the cache, each item in the memory cache retrieved from SSL connections is SDR-encrypted on user departure and decrypted on user return. The password for SDR is erased when the user leaves and retrieved from the token when the user returns.

Application-Aware Limitations

After making the modifications to these applications one can note several limitations. First, sensitive data may no longer be reachable in the application. These include secrets contained in leaked memory, due to programming errors in the application, and memory that has been freed. It is not possible to protect the former. However, using a pre-loaded library, calls to realloc, free, and delete can be intercepted and modified to zero freed memory.

Second, if the application has written secret information to the screen in a readable form, the application itself must directly obscure it; it can overwrite the data with blank pixels or other non-protected information. More generally, any secrets that have been passed to other processes may not be protected if they do not employ the API as well. Application-aware support may be added to windowing systems, window managers, and interface toolkits.

The third difficulty is the most challenging: identifying the secrets in the application. In the examples, an effort was made at identifying data structures containing secret data. However, this is an ongoing process that improves as one learns more about the structure of these programs. Since the modifications were not made by the original author of the applications, the effort is possibly more error-prone. In particular, if the application has made a copy of secret data that was not noticed during examination, it will not be protected. Methods to analyze the flow of secrets in the memory space are possible. One possibility may be to use language support.

CONCLUSION

Two embodiments of the present invention have been described herein, both of which use transient authentication. The first embodiment is transparent, operating without application modification. The second is an API that gives greater flexibility to application designers in dealing with authentication. The evaluation of these two techniques shows that transparent protection can both secure and recover the entire physical memory of the machine within seconds and that the API can be used to secure a complex application within tenths of a second.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system to maintain application data stored on a portable computer secure, the system comprising:
   an authorization client for use on the portable computer for making requests, the portable computer being capable of providing in-memory portions of address space for an application program;
   a security device to be associated with an authorized user of the portable computer and including an authorization server for supplying responses to the requests;
   a communication subsystem for wirelessly communicating the requests and the responses to the server and the client, respectively, within a range; and
   a cryptographic subsystem for encrypting data located in the in-memory portions of the address space to obtain corresponding encrypted data when the security device is outside the range of the communication subsystem and for decrypting the encrypted data when the security device is back within the range;
   wherein the requests include cryptographic requests for cryptographic information and wherein the server supplies the cryptographic information in response to the cryptographic requests and wherein the cryptographic subsystem utilizes the cryptographic information to either encrypt or decrypt the data.

2. The system as claimed in claim 1 further comprising means for suspending substantially all authorized user processes on the computer when the security device is outside the range and means for restarting the suspended authorized user processes on the computer when the security device is back within the range.

3. The system as claimed in claim 1 wherein the cryptographic information includes keys.

4. The system as claimed in claim 3 wherein the keys are encrypted.

5. The system as claimed in claim 3 wherein the keys include at least one master key.

6. The system as claimed in claim 5 wherein the at least one master key is a key-encrypting key.

7. The system as claimed in claim 1 further comprising means for suspending selected authorized user processes on the computer when the security device is outside the range and means for restarting the selected authorized user processes on the computer when the security device is back within the range.

8. The system as claimed in claim 1 further comprising a mechanism for establishing a binding between the portable computer and the security device to ensure that the security device only responds to a portable computer with a valid binding.

9. The system as claimed in claim 1 wherein the security device is an authorization token.

10. The system as claimed in claim 1 wherein the cryptographic subsystem includes encrypted keys and wherein the cryptographic information includes keys for decrypting the encrypted keys.

11. A method to maintain application data stored on a portable computer secure, the method comprising:

providing an authorization client for use on the portable computer for making requests, the portable computer being capable of providing in-memory portions of address space for an application program;

providing a security device to be associated with an authorized user of the portable computer and including an authorization server for supplying responses to the requests;

wirelessly communicating the requests and the responses to the server and the client, respectively, within a range;

encrypting data located in the in-memory portions of the address space to obtain corresponding encrypted data when the security device is outside the range; and decrypting the encrypted data when the security device is back within the range;

wherein the requests include cryptographic requests for cryptographic information and wherein the server supplies the cryptographic information in response to the cryptographic requests and wherein the cryptographic information is used to either encrypt or decrypt the data.

12. The method as claimed in claim 11 further comprising suspending substantially all authorized user processes on the computer when the security device is outside the range and restarting the suspended authorized user processes on the computer when the security device is back within the range.

13. The method as claimed in claim 11 further comprising establishing a binding between the portable computer and the security device to ensure that the security device only responds to a portable computer with a valid binding.

14. The method as claimed in claim 11 further comprising suspending selected authorized user processes on the computer when the security device is outside the range and restarting the selected authorized user processes on the computer when the security device is back within the range.

15. The method as claimed in claim 11 wherein the cryptographic information includes keys.

16. The method as claimed in claim 15 wherein the keys include at least one master key.

17. The method as claimed in claim 16 wherein the at least one master key is a key-encrypting key.

* * * * *